(12) United States Patent
Decker et al.

(10) Patent No.: US 6,905,415 B2
(45) Date of Patent: Jun. 14, 2005

(54) FLEXIBLE ELEMENT

(75) Inventors: Markus Decker, Kelsterbach (DE); Stefan Pfeiffer, Eppstein (DE); Lars Emmel, Oberursel (DE)

(73) Assignee: Siemens Aktiengesellschaft, Müchen (DE)

( * ) Notice: Subject to any disclaimer, the term of this patent is extended or adjusted under 35 U.S.C. 154(b) by 0 days.

(21) Appl. No.: 10/000,901

(22) Filed: Nov. 15, 2001

(65) Prior Publication Data

US 2002/0091001 A1 Jul. 11, 2002

(30) Foreign Application Priority Data

Nov. 20, 2000 (DE) ............................ 100 57 476

(51) Int. Cl.$^7$ ................................................ F16C 1/08
(52) U.S. Cl. ...................... 464/52; 74/502.6; 174/74 R
(58) Field of Search .......................... 464/52, 53, 174; 74/12, 500.5, 502.4, 502.5, 502.6; 174/74 R, 75 R; F16C 1/16, 1/14

(56) References Cited

U.S. PATENT DOCUMENTS

| | | | | |
|---|---|---|---|---|
| 797,360 A | * | 8/1905 | Kadlowec | ............... 464/174 X |
| 2,963,569 A | * | 12/1960 | Levine et al. | ......... 174/75 R X |
| 3,190,084 A | * | 6/1965 | Moon et al. | .................. 464/53 |
| 3,242,691 A | | 3/1966 | Robinson et al. | |
| 3,250,088 A | * | 5/1966 | Hanebuth | ..................... 464/53 |
| 3,258,031 A | | 6/1966 | French | |
| 3,372,560 A | * | 3/1968 | Dalton | ........................ 464/53 |
| 4,451,983 A | * | 6/1984 | Johnson et al. | ........... 464/52 X |
| 4,872,367 A | * | 10/1989 | Spease | ...................... 74/502.6 |
| 4,964,839 A | * | 10/1990 | Gloor | ........................ 464/52 X |
| 5,185,500 A | * | 2/1993 | Spinner | .................... 174/74 R |
| 6,668,680 B1 | * | 12/2003 | Freund et al. | ............ 464/52 X |

* cited by examiner

Primary Examiner—Greg Binda
(74) Attorney, Agent, or Firm—Martin A. Farber

(57) ABSTRACT

A flexible element, for example a flexible shaft, has a core (12) and a tubular sheathing (16) protecting the latter. Sleeve elements (20) surround the core and hold the tubular sheathing (16) between them. Different co-efficients of thermal expansion of the material for the tubular sheathing in comparison to the material of the core have previously led to undesirable distortions. To avoid these distortions in a structurally simple manner, at least one sleeve element (20) holds the tubular sheathing (16) with limited axial play (26). The play compensation between the sleeve element (20) and tubular sheathing (16) is particularly advantageous when the sleeve elements (20) are used for fixing the flexible elements (10).

9 Claims, 1 Drawing Sheet

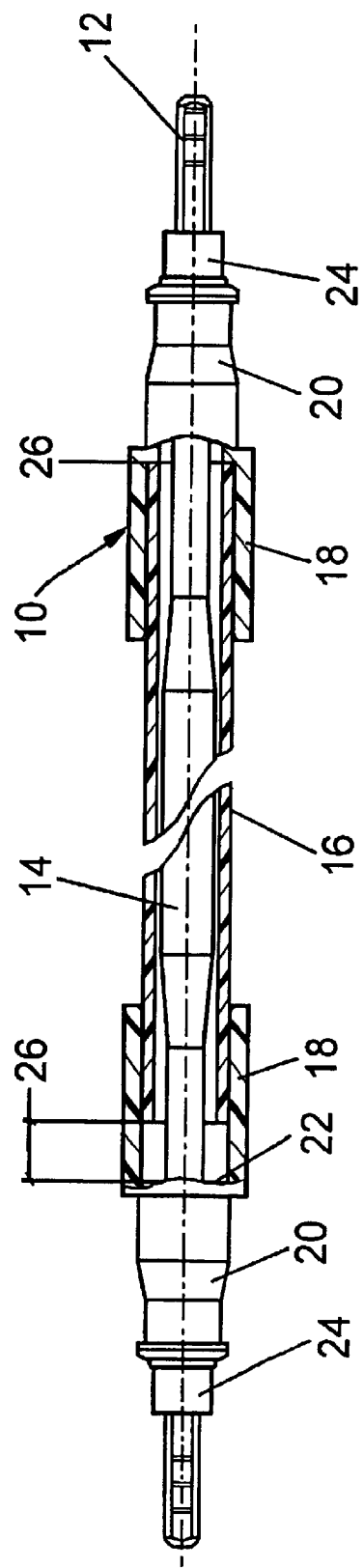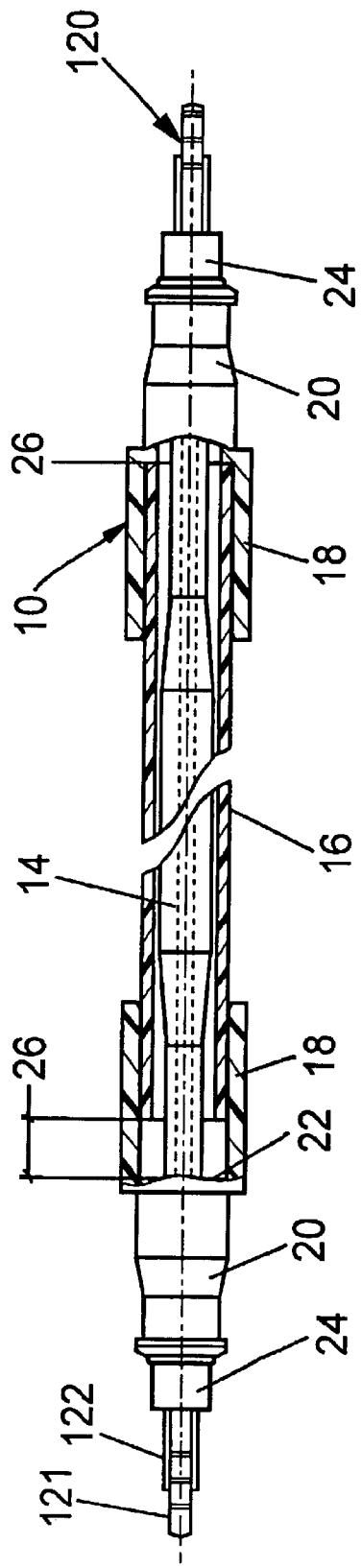

FLEXIBLE ELEMENT

FIELD AND BACKGROUND OF THE INVENTION

The invention is concerned with a flexible element having a core and a tubular sheathing protecting the latter, and sleeve elements which surround the core and between which the tubular sheathing is held, the core and the tubular sheathing having different coefficients of thermal expansion.

In the case of flexible elements, for example pliant flexible shafts or Bowden cables, in which the forces or moments can be transmitted by the core, or else in the case of electric lines, there is a fundamental problem of the protecting sheathings, which generally consist of plastic, having a considerably different coefficient of thermal expansion in comparison with the core which consists, for example, of steel or another metal on account of the mechanical stress or in order to achieve electric conductivity. The sleeves have previously been bonded or welded to the tube, with the result that when the sleeves are fixed axially and the core is fixed axially, problems may occur because of the different expansions due to temperature. This results in distortions of the flexible element, which may, for example in the case of drive elements, ensure that the element moves from its originally designated position, but at least cause frictional losses and an increased wear due to the bearing forces between the tubular sheathing and core. If the different expansions due to temperature are compensated for by cores which are fixed in an axially movable manner, there has to be the risk of the expanding tube pulling the core out of its guide, which should be avoided under all circumstances.

SUMMARY OF THE INVENTION

The object of the present invention is to provide a flexible element which is able to compensate for the different linear expansions of the sheathing and core in the event of changes in temperature.

According to the invention the object is achieved by a flexible element of the type described at the beginning in which at least one sleeve element holds the tube with limited axial play. In this case, the play in the sleeve element can be selected in such a manner that, on the one hand, the tubular sheathing cannot be separated from the sleeve element and, on the other hand, at the maximum linear expansion to be expected the tube does not entirely use up the designated play.

In this case, the flexible element according to the invention affords the advantage that the linear compensation can take place solely between the sleeve elements and the tube, which is Particularly advantageous when, as is frequently provided in the case of flexible shafts, for example, the sleeve elements can be fixed in housings or mountings on the drive side and power takeoff side.

As already mentioned, the invention is suitable for use in the case of shafts or Bowden cables, or else in cables, the flexible element according to the invention preferably being used particularly in the automotive sector with the considerable fluctuations in temperature which occur there.

A slight radial play is preferably provided between the tubular sheathing and the sleeve element, so that the linear compensation can take place with just a small amount of friction, but at the same time, there is also a certain amount of protection against the ingress of dirt.

In order to ensure protection for the comparatively sensitive tube ends, it is furthermore preferred for the at least one sleeve element having axial linear compensation to have a hollow cylindrical region into which the tubular sheathing is inserted.

While provision may be made, depending on the application, for the sleeve elements to be pressed onto the core and thereby to be fixed axially, under other conditions it may be desirable to permit a certain relative movement between the sleeve elements and the core, in particular, when the core and sleeve element are fixed separately, since otherwise distortions could also occur again at this point.

Since, in the case of movable sleeve elements, there has to be the risk under some circumstances of the tube ends slipping out of the sleeve elements or else of the core falling out of the protective sheathing prior to the final installation, it is provided, in a further, preferred design of the invention, that at at least one end, preferably at both ends, of the flexible element, there is fixed on the core a ring element which forms an axial stop for the associated sleeve element which encloses it and is movable axially. In the case of ring elements provided on two sides, there is no longer any risk of falling apart, even if handled carelessly, and so this design is preferred, in which case a further advantage is that the flexible element is constructed symmetrically, with the result that it cannot be fitted inverted.

BRIEF DESCRIPTION OF THE DRAWING

An exemplary embodiment of the invention will be discussed in greater detail below with reference to the attached drawing, wherein:

FIG. 1 shows a partially cut-open illustration of a flexible drive shaft; and

FIG. 2 is a view, similar to the view of FIG. 1, but showing an alternative embodiment wherein a core of the drive shaft of FIG. 1 is replaced with a Bowden cable.

DETAILED DESCRIPTION OF THE PREFERRED EMBODIMENT

FIG. 1 presents a partially cut-open illustration of a flexible drive shaft 10 as provided in the automotive sector for the connection between an electric drive motor and an electric of ventilator window actuated by the latter. For the transmission of the necessary moment, the flexible drive shaft has a steel core of customary design with a thickened central section 14. For the protection of the shaft core 12 and also of the surrounding parts, the core is surrounded by a flexible tubular sheathing 16 which sits at both of its ends in hollow cylindrical sections 18 of sleeve elements 20. In this case, the tube ends are not connected fixedly to the hollow cylindrical sections 18; rather, they only sit in the latter with slight play, with the result that an axial displacement of the tube relative to the sleeve elements 20 is possible until the tube ends bear against end surfaces 22.

The sleeve elements, which preferably consist of plastic, can be fixed on the drive side and power take-off side in corresponding sockets, so that the space between the core 12 and the tubular sheathing 16 is closed in a protected manner.

The sleeve elements 20 are movable relative to the core 12, their axial mobility being limited by ring elements 24 which are pressed in certain positions onto the ends of the core 12. The ring elements may, for example, consist of brass and prevent the sleeve elements 20 from being able to move into a position in which a tube end of the tubular sheathing 16 can slide out of the hollow cylindrical section 18 belonging to it. The ring elements 24 also prevent the core 12 from falling out or at least from slipping.

In the event of changes in temperature, which may be considerable in the motor vehicle, for example when the vehicle heats up after a cold winter's night or when parked in direct sunlight, the steel core 12 and the tubular sheathing 16 expand by different amounts on account of their different coefficients of thermal expansion, in which case one tube end or, depending on the relative position, both tube ends can move in the hollow cylindrical section 18 if a designated play 26 has not be used up. of course, the play 26 will be dimensioned in such a manner that at the lowest temperatures to be expected, the tube ends are still held securely in the hollow cylindrical sections 18 and, at the maximum temperatures to be expected the tube ends do not bear on both sides against the end surfaces 22, which could, as a consequence of the path of deflection of the sleeve element 20 being limited by its fitting and by the bearing against the ring elements, lead to distortions and deformations of the tubular sheathing 16 and to undesirable applications of force in the core 12.

On account of the symmetrical construction of the flexible drive shaft 10, attention does not have to be paid to a particular fitting position, since it is irrelevant which sleeve element 20 is fixed on the drive side and which on the power take-off side.

Depending on the type of fitting and intended use, it may be conceivable to fix the sleeve elements 20 on the ring elements 24 or to fix the sleeve elements 20 themselves directly to the core 12 of the flexible drive shaft 10, for example by pressing them on.

It is also conceivable to construct a Bowden cable in a manner similar to the foregoing description of the flexible drive shaft 10, in accordance with a further embodiment of the invention shown in FIG. 2, wherein the core 12 of FIG. 1 is replaced in FIG. 2, wherein the core 12 of FIG. 1 is replaced in FIG. 2 with a Bowden cable 120 comprising a core 121 enclosed by a sheath 122 and slidable within the sheath 122 in accordance with the well-known construction of a Bowden cable. In the embodiment of FIG. 2, the protective sheathing 16 surrounds the supporting sheath 122 of the Bowden cable 120. Other applications, for example, in the electric cable sphere, in which the core 12 does not have the task of transmitting drive forces, are also conceivable.

What is claimed is:

1. A flexible element having:
   a core (12) for transmission of a mechanical force or moment by the core or for transmission of electricity by the core, a tubular sheathing (16) protecting the core, said core and said tubular sheathing being moveable relative to each other and having different coefficients of thermal expansion,
   first and second sleeve elements (20) encircling the core (12) and being movable relative to the core (12), said first and said second sleeve elements holding the tubular sheathing (16) between said first and said second sleeve elements, and
   ring elements (24) being fixed at the ends of the core (12) and forming an axial stop to limit motion of associated ones of said sleeve elements (20) to maintain said sleeve elements in positions for engaging said tubular sheathing, wherein
   at least one of said sleeve elements (20) has an interior space providing play, and holds the tubular sheathing (16) with limited axial play (26) dimensioned in such a manner that, within an operating temperature range, at the lowest temperature of the range, the ends of the tubular sheathing are still held, securely in the sleeve elements and at the maximum temperature of the range, a smaller axial play remains, the core extending from a first of the core ends to a second of the core ends with said ends of the core being free ends axially extending through said ring elements (24).

2. The flexible element as claimed in claim 1, wherein an axial play (26) is provided in both said sleeve elements (20).

3. The flexible element as claimed in claim 1, wherein at least one of said sleeve elements (20) has a hollow cylindrical region (18) into which the tubular sheathing (16) is inserted.

4. The flexible element as claimed in claim 1, wherein said ring elements (24) serve for limiting mobility of said sleeve elements (20).

5. The flexible element as claimed in claim 1, wherein the sleeve elements (20) are located at opposite ends of the sheathing (16).

6. The flexible element as claimed in claim 1, wherein the flexible element (10) is a drive element, being either a flexible shaft or a Bowden cable.

7. The flexible element as claimed in claim 6, wherein the flexible element is a Bowden cable, and the tubular sheathing (16) surrounds a supporting sheath of said Bowden cable.

8. The flexible element as claimed in claim 1, wherein the flexible element is an electric cable.

9. A flexible element having:
   a core (12) for transmission of a mechanical force or moment by the core or for transmission of electricity by the core, and a tubular sheathing (16) protecting the core, said core and said tubular sheathing being moveable relative to each other and having different coefficients of thermal expansion;
   first and second sleeve elements (20) encircling the core (12) and having interior regions providing play and being movable relative to the core (12), said first and said second sleeve elements having respective cylindrical sections (18) for receiving and for holding opposite ends of the tubular sheathing (16) with axial play between said first and said second sleeve elements, the sleeve elements cooperating with the sheathing to close spaces between the core and the sheathing; and
   first and second ring elements (24) fixed to the ends of the core (12), and serving as axial stops to limit motion of respective ones of said sleeve elements (20) to maintain said sleeve elements in Positions for engaging said tubular sheathing, wherein
   the axial play provides that, at the lowest temperature of an operating temperature range, the ends of the tubular sheathing are still held in the sleeve elements securely, and that at the maximum temperature of the range, a smaller axial play remains.

* * * * *